United States Patent Office 3,468,858
Patented Sept. 23, 1969

3,468,858
VINYL CHLORIDE-PROPYLENE COPOLYMERS
Charles A. Heiberger, Princeton, N.J., and Leon Fishbein, New City, N.Y., assignors to Air Reduction Company, Incorporated, New York, N.Y., a corporation of New York
Filed Dec. 31, 1964, Ser. No. 422,619
Int. Cl. C08f 15/04, 15/06
U.S. Cl. 260—87.5        13 Claims

ABSTRACT OF THE DISCLOSURE

Vinyl chloride-propylene copolymers having desirable processing characteristics are prepared by the copolymerization of vinyl chloride and propylene under moderate temperature and pressure conditions in the presence of a free-radical catalyst. The copolymers are characterized by the combination of a propylene content of 1 to 10%, preferably 2 to 8%, by weight, an intrinsic viscosity of 0.5 to 1.5 dl./g., preferably 0.55 to 1.10 dl./g., and a melt flow rate of at least 0.1 dg./min., preferably at least 1 dg./min., the copolymers being rigid materials as evidenced by an apparent modulus of elasticity of at least 100,000 p.s.i. at a maximum temperature within the range of about 65 to about 80° C. The vinyl chloride-propylene copolymers are particularly suited for molding, e.g. blow molding, when compounded with a lubricant and a stabilizer, and have desirable stability characteristics even with relatively mild non-toxic stabilizers. The overall processing characteristics of the copolymers is expressed in terms of a Dynamic Processability Index of at least 300.

---

Figure 1:
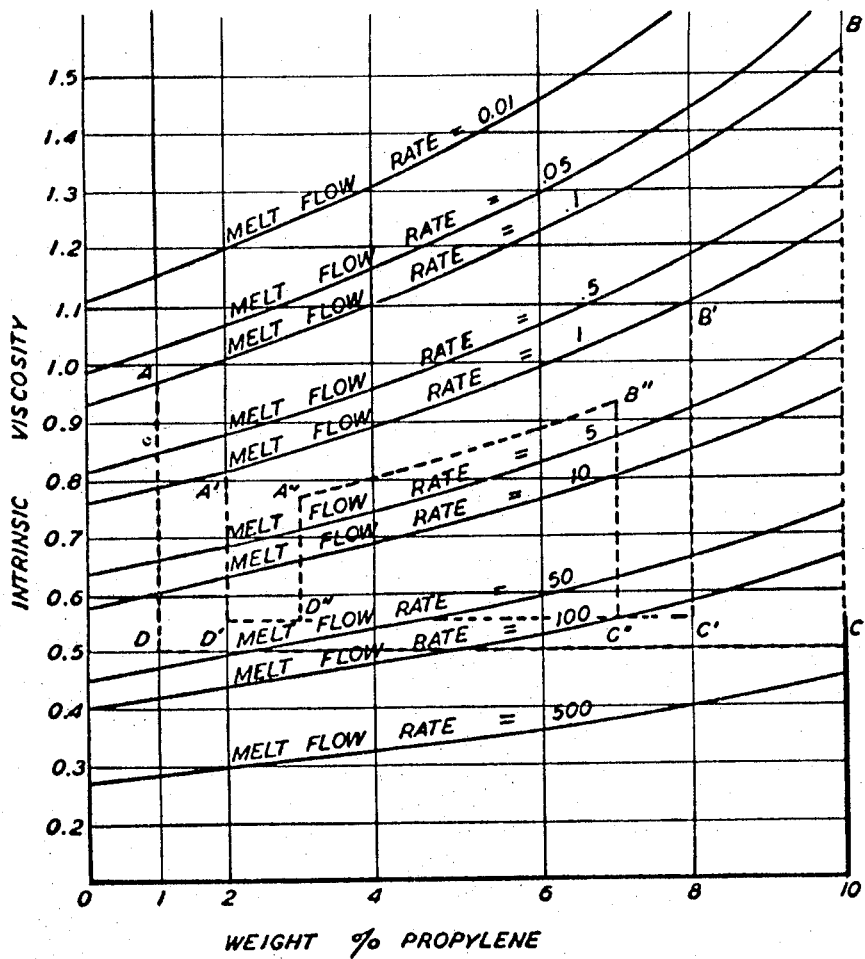

The present invention is concerned with rigid resinous compositions for hot molding, extrusion, thermoforming, and other hot shaping operations which compositions have improved physical properties and processing characteristics, and the invention is more particularly concerned with molding, extrusion and other formable compositions of the character indicated formed from polymers comprising vinyl chloride and propylene, i.e. polymers produced by the polymerization of vinyl chloride in the presence of propylene, hereinafter referred to for convenience as vinyl chloride-propylene copolymers. The invention is also concerned with processes for the preparation of these vinyl chloride-propylene copolymers, and with rigid shaped articles produced by the shaping of the resinous compositions under the influence of heat.

Rigid resinous compositions are defined by ASTM D883 as plastics which have a stiffness or apparent modulus of elasticity greater than 100,000 p.s.i. at 23° C., when determined in accordance with The Method of Tests for Stiffness in Flexure of Plastics (ASTM D747). Vinyl chloride homopolymers are, in general, rigid material characterized by substantial resistance to chemical attack, and they are used extensively in the chemical processing industry as well as in other manufacturing applications. Thus, unplasticized rigid polyvinyl chloride resins have a combination of properties generally not obtainable with other known low cost commercial plastics, viz:

(1) Excellent resistance to water, acids, alkalies, salts, organic chemicals, and to external aging environments.
(2) Low vapor permeability to water, oxygen and many volatile organic compounds.
(3) High clarity and gloss.
(4) High modulus and physical strength.
(5) Non-flammability.
(6) Good electrical properties.

However, resinous compositions comprising rigid vinyl chloride homopolymers are difficult to mold, to extrude or to flux and mill satisfactorily on conventional equipment, i.e. they have poor flow characteristics and stability under dynamic processing conditions. This poor dynamic processability is due in part to the high melting point of the homopolymers and to the high viscosity evidenced by the polymers at temperatures above the softening point of the polymers and in the range encountered with conventional manufacturing operations of the type mentioned. Furthermore, such homopolymers tend to decompose or to degrade thermally before reaching a viscosity sufficiently low to assure the flow characteristics necessary for many manufacturing operations.

Thus, commercial applications of polyvinyl chloride rigid resin compositions have been limited and/or excluded in certain cases by practical difficulties in processing, e.g. in the extrusion and molding of end products having desired characteristics. The proximity of the glass transition temperature (below which flow is negligible) and the temperature at which the resin is unstable (discolors and degrades) not only requires close and careful control of processing conditions, but some processes, particularly injection molding, have not been possible under practical conditions, from both economic and technical considerations.

Attempts to improve the processing characteristics of polyvinyl chloride have involved the incorporation of so-called "external" plasticizers, such as dioctyl phthalate, or the formation of so-called "polyblends" with butadiene-acrylonitrile or acrylate polymers, or similar compounding ingredients, or the polyvinyl chloride has been prepared by polymerization processes which lead to a polymer of low molecular weight. These procedures, however, have ordinarily proven unsatisfactory because any improvement achieved has frequently been accomplished by an undue sacrifice of other desirable physical properties of the polymers, such as rigidity, impact toughness, heat-distortion temperature, chemical resistance and the like, or the products are economically unattractive for most applications.

For example, in the case of low molecular weight polyvinyl chloride resins, physical strength and impact toughness are severely decreased, and the resultant lower heat stability is a problem. When use is made of external plasticizers, the presence of even small concentrations of plasticizers results in lower strength and reduced toughness. Polyblends with butadiene-acrylonitrile rubbers or acrylic polymers or like materials do not give clear rigid plastics, are expensive, and degrade other properties such as weather resistance, chemical resistance, and non-flammability. In short, when attempts are made to modify the processing characteristics of polyvinyl chloride compositions, the resultant shaped products lack the desired properties.

It has also been proposed to copolymerize vinyl chloride with various comonomers, such as vinyl acetate, dioctyl fumarate, octyl acrylate and the like, but compositions having the desired dynamic processability and at the same time having the desired characteristics for making rigid products have not heretofore been successfully produced by this technique. While copolymers with vinyl acetate or dialkyl fumarates are both available commercially, these copolymers are less heat stable, less dimentionally stable, and less chemically resistant than polyvinyl chloride resins and, in addition, they comprise a more expensive resin composition.

In particular, heat distortion temperatures above 150° F., desired in rigid shaped products, such as containers, are not always obtained.

It is accordingly, an object of this invention to provide rigid resinous compositions comprising vinyl chloride polymers which avoid the disadvantages and drawbacks of vinyl chloride polymer compositions heretofore known.

In Heiberger et al. co-pending application Serial No. 390,416 filed Aug. 18, 1964, there is disclosed a class of vinyl chloride-ethylene copolymers which have advantageous properties, and are effective in compositions for making rigid products. In accordance with the present invention, it has now been found that vinyl chloride polymers having improved physical properties and processing characteristics, including high dynamic heat stability, and effective to form resinous compositions for the production of rigid products, can be obtained by the polymerization of vinyl chloride with small amounts of propylene. Such vinyl chloride-propylene copolymers can be used in any of the applications in which conventional vinyl chloride homopolymers have heretofore been employed, as well as those previously believed precluded for such polymers, e.g. certain extrusion and injection molding operations, as well as blow-molding operations.

Thus, the present invention effectively solves the foregoing problems by providing rigid resinous compositions which have the desirable dynamic processability, including dynamic heat stability, which makes them suitable for the formation of shaped products under the influence of heat without thermal decomposition, yet they are effective to produce shaped products which are truly rigid and have an elevated heat-distortion temperature above 150° F.

We have, in effect, discovered a family of vinyl chloride-propylene copolymer resins which permit the preparation of rigid resinous compositions which have outstanding dynamic processability, including markedly improved heat stability, yet retain the impact toughness, dimensional stability and other desirable properties of unmodified polyvinyl chloride rigid resinous compositions. These vinyl chloride-propylene copolymers contain at least 1% by weight of propylene, with a particularly useful range being from about 2% to about 8%, but they can contain higher percentages of propylene, e.g. about 10% or more by weight. Outstandingly advantageous properties with respect to the invention are exhibited by vinyl chloride-propylene copolymers containing 3 to 7% by weight of propylene. The vinyl chloride-propylene copolymers contemplated by this invention also have an average molecular weight, expressed in terms of intrinsic viscosity, of 0.5 to about 1.5 dl./g., preferably 0.55 to 1.10 dl./g., and most advantageously 0.55 to 0.95 dl./g., in combination with a melt flow rate of at least 0.1 dg./min., preferably at least 1 dg./min., and an apparent modulus of elasticity of at least 100,000 p.s.i. at a maximum temperature within the range from about 65° C. to about 80° C. As a general rule, the melt flow rate will be at most about 500 dg./min., preferably at most about 200 dg./min., and the above-mentioned copolymers having a propylene content of 3 to 7% and an intrinsic viscosity of 0.55 to 0.95 dl./g., most suitably have a melt flow rate of about 3 to about 100 dg./min.

Intrinsic viscosity values in dl./g., as used herein, are determined in conventional manner by extrapolation to infinite dilution of the reduced viscosity values at several concentrations of the polymer in cyclohexanone, as determined, for example, according to ASTM D1243–60, Method A but at 25° C. Weight percent propylene in the coplymers is determined from chlorine analysis and correlated with volume percent propylene as determined by measurements of specific gravity (ASTM D792–60T) on a standard molded composition containing 3 parts by weight of an organic tin mercaptide stabilizer (Advastab T–360) per 100 parts by weight of copolymer. Melt flow rate is determined by means of ASTM D1238–57T, condition F, for the copolymer in the above standard molded composition. The apparent modulus of elasticity is determined by means of ASTM D1043–61T and the results are expressed as $T_f$, in ° C., which is the temperature corresponding to 135,000 p.s.i. apparent modulus of elasticity. As is known, the $T_f$ value which is expressed in terms of apparent modulus of elasticity, as mentioned, corresponds approximately to the heat distortion temperature.

Heat stability can be determined in several ways. In a first method, a sample of the resin, in the form of a milled sheet composition containing 3 parts by weight of an organic tin mercaptide stabilizer (Advastab T–360), is maintained in an air oven at 400° F. and the time, in minutes, after which the resin sample turns black is noted. The change to black occurs relatively suddenly and there is no appreciable transistion in color. In a second method, heat stability is determined by boiling a 1% by weight solution of the copolymer in cyclohexanone at a temperature of 155° C., under reflux and under a nitrogen atmosphere, for a period of 1.5 hours. The optical density of the solution contained in a one-centimeter spectral cell is then measured at 460 millicrons, using an ultra violet spectrometer. The optical density of the solution thus obtained is a direct measure of the dehydrochlorination which has occurred during the heating of the polymer, with low optical density values indicating a polymer having high heat stability and, conversely, high optical density values indicating a polymer having poor heat stability.

Thus, the vinyl chloride-propylene copolymers can be characterized as having composition-melt flow relationships falling substantially within the area delineated by the points A, B, C, and D of FIG. 1 of the accompanying drawings. Similarly, the copolymers having the advantageous propylene content of above 2% to about 8% can be characterized as having composition-melt flow relationships falling substantially within the area delineated by the points A′, B′, C′, and D′ of FIG. 1, and the vinyl chloride-propylene copolymers having the most outstanding properties with respect to rigid resinous compositions for producing rigid shaped articles have the relationships falling substantially within the area delineated by the points A″, B″, C″, and D″ of FIG. 1. The reference above to apparent modulus of elasticity of at least 100,000 p.s.i. at a temperature within the range from about 65° C. to about 80° C., serves to characterize the copolymer as rigid resinous materials within the standard definition, to distinguish them from non-rigid resinous materials, and as long as the copolymers meet this minimum value they are suitable for use where rigid compositions are desired.

In the accompanying FIG. 1, compositions having equal melt flow rates are shown as functions of intrinsic viscosity and weight percent propylene in the copolymer resins. Flow rates at 0% propylene correspond to data obtained on vinyl chloride homopolymers. By appropriate selection of intrinsic viscosity and propylene content, copolymer can be prepared to any specified flow rate for optimum processability and physical properties in the fabrication of rigid plastic products. Thus, by reference to FIG. 1, it can be seen that the vinyl chloride-propylene copolymers can be prepared either with flow rates equal to vinyl chloride homopolymers but at higher intrinsic viscosities, with corresponding improvements in impact toughness and other physical properties, or at intrinsic viscosities equal to vinyl chloride homopolymers, with substantial improvement in flow rate and processing characteristics, or at intermediate intrinsic viscosities, with improvement in both flow rate, processability and physical properties.

In the oven stability test described above, vinyl chloride-vinyl acetate copolymer resins have been found to run less than 15 minutes at 400° F. before first evidence of black discoloration, whereas the vinyl chloride-propylene copolymer compositions contemplated by this invention run typically from 40 to 50 minutes.

Thermal stability tests by the second described method, where low optical density indicates high stability and low degree of dehydrochlorination in boiling cyclohexanone solution, gave the following results when typical vinyl chloride-propylene copolymers were compared with well-known vinyl chloride homopolymers:

| Resins | Propylene, wt. percent | Intrinsic Visc., dl./g. | Optical density |
|---|---|---|---|
| Geon 103EP | | 0.93 | 0.85 |
| Vygen 85 | | 0.83 | 0.87 |
| Bakelite QYSA | | 0.63 | 1.05 |
| VC-P Copolymer | 2.1 | 0.76 | 0.14 |
| Do | 5.9 | 0.67 | 0.12 |
| Do | 8.1 | 0.57 | 0.17 |

As a group, the vinyl chloride-propylene copolymers are unusually heat stable as compared to PVC homopolymer resins, and characteristically have optical density values well below 0.5, and generally below 0.20 as evidenced by the copolymers above.

The vinyl chloride-propylene copolymers with which this invention is concerned can also be characterized in terms of their dynamic behavior when tested in a standard Brabender plastograph. This well-known instrument is described, for example, in "Kunststoffe," vol. 54, pp. 169–177 (March 1964), and is, in effect, a miniature Banbury mixer. In making the determination of the dynamic properties of the vinyl chloride-propylene copolymers, the Brabender plastometer is operated at a fixed bowl temperature of 375° F. and at 63 revolutions per minute of the sigma blade mixing arms. The standard test specimen subjected to test in the Brabender plastometer is a composition consisting of the resin compounded with 3 parts per hundred of the standard stabilizer Mark 292 (alkyl tin thio glycollate) and 0.5 part per hundred of mineral oil as a standard lubricant.

Results are plotted as the torque in gram-meters against time in minutes. The test is continued until the plotted line definitely turns upwardly and continues upwardly, which indicates decomposition. Thus, the time required before decomposition is a measure of heat stability under dynamic conditions, i.e. dynamic heat stability. When the time in seconds to decomposition is divided by the torque in kilo gram-meters at decomposition, and this product is multiplied by the square of the intrinsic viscosity, there is obtained a numerical value which can be referred to as the "Dynamic Processability Index."

A series of vinyl chloride-propylene copolymers representative of those relating to this invention and two commercial polyvinyl chloride resins were evaluated in a Brabender plastograph in accordance with the previously-specified conditions for testing with this instrument. The properties of the resins in the test specimens were as follows:

| Code | Resin | Intrinsic Visc., dl./g. | Comonomer Type | Wt. percent |
|---|---|---|---|---|
| A | Geon 103EP | 0.93 | None (PVC) | |
| B | VC-P Copolymer | 0.90 | Propylene | 2.8 |
| C | do | 0.75 | do | 3.7 |
| D | do | 0.65 | do | 5.2 |
| E | do | 0.55 | do | 5.9 |
| F | Bakelite VYHH | 0.52 | Vinyl acetate | 13.0 |

Figure 2:
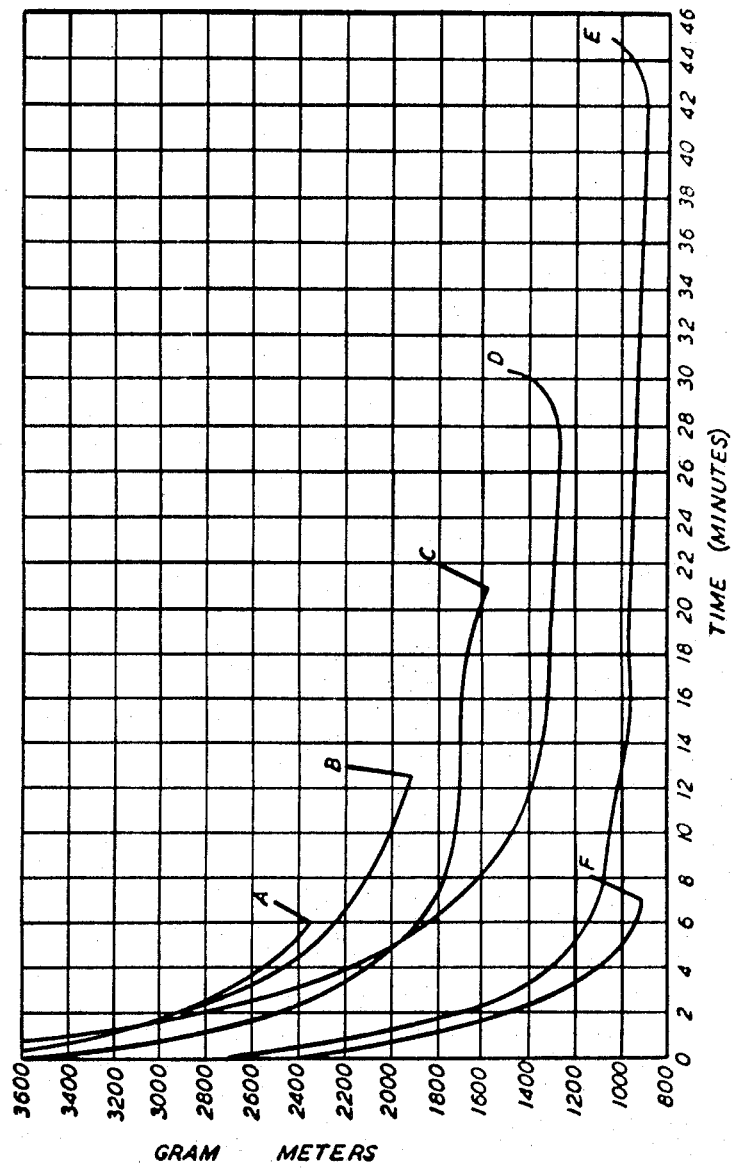

The results are shown in FIG. 2 wherein torque in gram-meters (proportional to melt viscosity) is plotted as a function of time (proportional to dynamic stability). The four vinyl chloride-propylene copolymer compositions show substantial increases in processability in comparison to commercial resins A and F, which represent extremes of low and high melt flow. By referring to FIG. 2 and to the intrinsic viscosity values in the foregoing table, it will be seen that compositions A, B, C, D, E, and F have, respectively, Dynamic Processability Indices of 130, 320, 450, 560, 830 and 125.

The "Dynamic Processability Index" of the copolymers with which this invention is concerned is at least 300 and preferably at least 400.

The above-characterized vinyl chloride-propylene copolymers in the form of formable compositions have high melt flow characteristics which are usually 2 to 100-fold or more of those of polyvinyl chloride resins of the same molecular weight. Chemical resistance, impact toughness, clarity, non-flammability, electrical properties, and the like are comparable or superior to polyvinyl chloride resins, but their dynamic heat stability is significantly greater than that of polyvinyl chloride resins. In particular, the formable resinous compositions of this invention which comprise the above-characterized vinyl chloride-propylene copolymers can be effectively employed for making rigid structures for use in industrial and consumer containers, piping, electrical conduits, structural panels, packaging film, and other molded and extruded products. It will be understood that the formable compositions or compounds formed from these vinyl chloride-propylene copolymers, e.g. molding compounds or extrusion compounds, are used in conventional particulate form, e.g. as pellets, powders, granules, and the like.

A particularly important feature of the novel copolymer compositions of this invention is the surprising and unexpected combination of desirable melt flow characteristics and unusual heat stability. In other words, these copolymers have exceptionally good dynamic processability, as above described, which permits their use in rigid resinous compositions for molding, extrusion, and other operations for which conventional vinyl chloride polymers are unsuited. Because of their unusual heat stability, these vinyl chloride-propylene copolymer compositions can be processed at higher temperatures with resulting low melt viscosity as compared to conventional vinyl chloride homopolymers and other conventional copolymers. Although many vinyl chloride copolymers, such as copolymers with vinyl acetate, dioctyl fumarate, octyl acrylate, etc., show high melt flow characteristics, all of these conventional copolymers are less stable to heat than the vinyl chloride-propylene copolymers and, therefore, have poor dynamic processability. The vinyl chloride-propylene copolymer compositions are readily handled by conventional molding, extruding, coating and like machinery, by reason of their properties at the temperatures employed in such apparatus. The unusual dynamic heat stability of the vinyl chloride-propylene copolymers makes it possible for them to be used in formable compositions for producing containers, packages, and other items which are adapted to come into contact with foods. One problem encountered in the vinyl chloride polymer art relating to rigid resinous compositions is that it has generally been necessary to use stabilizers which are not acceptable in products intended for contact with food. This has been due to the fact that when polymers have relatively poor heat stability, the stabilizers used with them in formable compositions must be highly effective and, generally speaking, the most highly effective stabilizers are not approved for use with foods. The less effective stabilizers which are approved for use wtih food, on the other hand, are generally not sufficiently potent to be effective with resins of ordinary heat stability. The unusual dynamic heat stability of the vinyl chloride-propylene copolymers defined above, however, makes it possible for less effective stabilizers to be used in molding, extruding or coating compositions containing these copolymers, so that there can be satisfactorily produced numerous products which can be employed in the food packaging art.

When the above-described vinyl chloride-propylene copolymer resins are employed in rigid resinous compositions, they suitably have added to them stabilizers and lubricants, and they may also be compounded with fillers, pigments, and resin additives to modify properties as desired. Conventional compounding agents of a type well known in the polymer art, and particularly in connection with vinyl resins, are suitably used. For example, suitable stabilizers include the well-known alkyl tin mercaptide (Thermolite 31), di-octyl tin dilaurate, basic lead carbonate, metal phenates such as zinc, lead or tin phenate, and barium n-nonyl phenate, fatty acid soaps of lead, cadmium, barium, calcium, magnesium and zinc, cadmium benzoate, triphenyl phosphite, mono-octyl diphenyl phosphite, di(epoxyethyl)benzene, epoxidized fatty oils, manganous pyrophosphite, and the like, alone or in combination. The function of various stabilizers in such polymers is well known and is described, for example, in "Polymer Processes" by Schildknecht, pages 542–548. In general, any of the many stabilizers suitable for use with polyvinyl chloride may be employed. When the compositions are to be used for food packaging, or the like, the stabilizer and the other additives must be those which are approved for such use, i.e. they must be non-toxic. Approved additives are well-known and typical approved stabilizers, for example, are non-toxic stabilizers which include fatty acid soaps of metals of Group II of the Periodic Table having an atomic weight of less than 100, such as the calcium, magnesium and zinc soaps of stearic, lauric and ricinoleic acids, as well as the alkali metal soaps of fatty acids, and various wholly organic stabilizers.

In like manner, conventional lubricants, such as mineral oil, fatty acids, synthetic waxes of the fatty amide and ester types, octyl stearate and calcium stearate, are used. Polymer lubricants are referred to in Schildknecht, pp. 685 et seq. The stabilizers or inhibitors and lubricants are used in varying quantities, such as described in the foregoing publication, depending upon the nature of the individual agent. For example, stabilizers are generally used in the amount of 0.5 to 5% by weight of the copolymer but the overriding criterion is the use of a small amount sufficient to effect the desired stabilization. The same considerations apply in the use of lubricants. In general, lubricants are used in amounts ranging from 0.1 to 1% or more by weight of the copolymer. In accordance with this invention, the vinyl chloride-propylene copolymers are combined with 0.1 to 10% by weight of combined lubricant and stabilizer.

Any and all pigments commonly employed in coloring polyvinyl chloride compositions may be used, such as carbon black, titanium dioxide, phthalocyanines, and the like, depending upon the color, if any, desired in the final product.

Either fibrous or non-fibrous fillers may be employed in preparing resinous compositions comprising the vinyl chloride-propylene copolymers. The fibrous fillers that may be used include asbestos, glass fibers, cotton, rayon, nylon and the mineral wools. Asbestos is the most commonly used fibrous filler. The useful non-fibrous inorganic fillers include the many materials that are commonly employed as fillers in the plastics industry. These include, for example, calcium carbonate, calcium sulfate, calcium silicate, barium carbonate, barium sulfate, silica, china clay, kaolin, fuller's earth, and magnesium silicate, as well as such pigments as titanium dioxide, lead chromate, and iron oxide. The fibrous fillers can suitably be used in amounts up to approximately 200 parts and the non-fibrous fillers in amounts up to approximately 300 parts by weight per 100 parts by weight of vinyl chloride copolymer resin.

While plasticizers are not ordinarily used in making rigid products, they can be used if desired. Any of the usual plasticizers for vinyl chloride resins may be used in the compositions of the present invention. These include, for example, dioctyl phthalate, dibutyl sebacate, tricresyl phosphate, and the like. The amount of plasticizers which can be used can vary depending on the rigidity and hardness desired.

In addition to the ingredients described, other resin additives, such as extenders, solvents, binders, and the like, may be present in the amounts ordinarily employed in the polyvinyl chloride art.

It is sometimes desirable to compound the vinyl chloride-propylene copolymer resin compositions with other resinous materials which have a modifying effect upon the copolymer resin. Examples of resinous materials suitable for this purpose include polyvinyl chloride, vinyl chloride-vinyl acetate copolymer and other vinyl chloride copolymers, chlorinated polyolefins, chlorinated polyvinyl chloride and chlorinated vinyl chloride copolymers, acrylonitrile-butadiene-styrene polymers, acrylonitrile-butadiene copolymers, alkyl acrylate-methacrylate copolymers, such as polymers containing ethyl acrylate and methyl methacrylate, ethylene-alkyl acrylate copolymers, ethylene-vinyl acetate copolymers, and chlorinated paraffin waxes. Such modifying resinous materials can be used in various amounts but ordinarily in relatively minor proportions, e.g. less than 50% by weight of the vinyl chloride-propylene copolymer resin, preferably 10 to 25%.

It will be understood that the rigid resinous compositions of this invention, e.g. molding compounds or extrusion compounds, comprising the vinyl chloride-propylene copolymers having the specified characteristics are suitably employed in practice in conventional particulate form, e.g. as pellets, powders, granules, and the like. It will also be understood that in forming the rigid resinous compositions of the invention, the components which are combined with the vinyl chloride-propylene copolymers may serve more than one function. For example, it is well known that some stabilizers have appreciable lubricating properties, or that some so-called lubricants are also effective stabilizers. Calcium stearate is a typical example of an additive suitably used in forming our rigid resinous compositions, which functions both as a lubricant and a stabilizer, although it is a relatively weak stabilizer. However, as previously discussed, the vinyl chloride-propylene copolymers above characterized produce compositions having desirable dynamic processability, including dynamic heat stability, even when the stabilizer employed is relatively weak in its activity. Accordingly, while the compositions are defined as comprising the vinyl chloride-propylene resin, a stabilizer, and a lubricant, it will be understood that a single additive can meet the stabilizer and lubricant requirements, and that two different additives are not always required. The same is true of other additives; thus a modifying resinous material may also serve as a plasticizer, and a filler may also serve as a pigment, and the like.

In all cases, the vinyl chloride-propylene copolymer has the characteristics set forth above, combining propylene content, average molecular weight (intrinsic viscosity), melt flow rate, apparent modulus of elasticity, and is characterized by having the above-mentioned Dynamic Processability Index.

The preparation of vinyl chloride-propylene copolymers, having the desirable characteristics which are possessed by the above-described copolymers was unexpected due to the extremely poor reactivity of propylene in comparison with vinyl chloride, as evidenced by the rigorous conditions necessary to effect the homopolymerization of propylene. It was to be expected that there would be no significant difference between the product of the polymerization of vinyl chloride in the presence of propylene and the homopolymer of vinyl chloride. In contrast to the expected, however, we have found that there can be prepared vinyl chloride-propylene copolymers having the characteristics specified above. The nature and advantageous features of rigid formable resinous compositions comprising the indicated family of vinyl chloride-propylene copolymers of this invention will become more readily apparent as the description of the invention proceeds.

Another important feature of the vinyl chloride-propylene copolymers is that they can be effectively produced, even with a relatively high propylene content, by a process which does not require the use of high pressures or elevated temperatures, and thus can be carried out with no difficulty in relatively inexpensive, conventional polymerization equipment. We have discovered that the copolymers can be produced at pressures that need to be no higher than about 250 pounds per square inch, usually in the range of 110 to 180 pounds per square inch, and that temperatures of 30 to 75° C. are suitably used, and the most preferable temperatures lie in the range of 45° to 60° C.

In this polymerization system, propylene, besides having unfavorable reactivity ratios with vinyl chloride, appears to function as a chain transfer agent. Accordingly, another important feature of this invention is the recognition of this fact and the discovery of process means to produce the vinyl chloride-propylene copolymers having the combination of desirable physical properties and the unusual dynamic processing characteristics discussed above.

Figure 3:
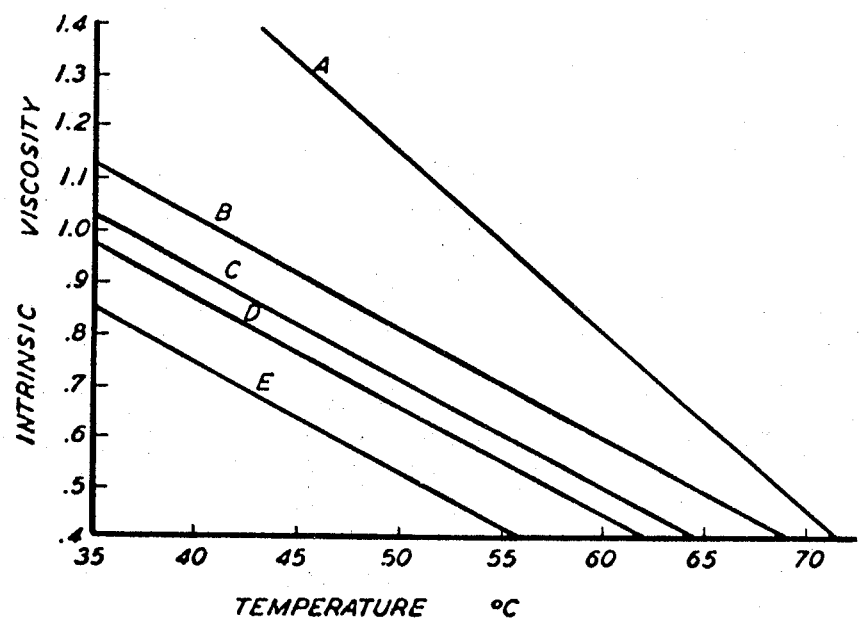

While the temperatures employed to produce these copolymers are generally in the range of 30° to 75° C., as is the case with the homopolymerization of vinyl chloride, the molecular weight (as measured by intrinsic viscosity) of vinyl chloride-propylene copolymers prepared at any given reaction temperature is significantly lower than the molecular weight of vinyl chloride homopolymers or, for example, vinyl chloride-vinyl acetate copolymers prepared at the same temperature. In FIG. 3 is shown typical relationships of the intrinsic viscosities of vinyl chloride homopolymers and vinyl chloride-propylene copolymers, prepared by a batch process, and the reaction temperature at which they were prepared. Curve A of FIG. 3 illustrates the conventional relationship of intrinsic viscosity to reaction temperature for vinyl chloride homopolymers prepared with 0.2% lauroyl peroxide as catalyst. Curves B, C, D, and E show some typical relationships for various batch copolymerizations of vinyl chloride and propylene at various ratios of propylene to total monomers fed to the system. In Curve B, the copolymers represented were prepared from 95% vinyl chloride and 5% propylene, and polymerization was effected with 0.2–0.3% t-butyl peroxy pivalate, at 3 to 1 water to total monomer ratio, and 80% fillage of reactor volume. In Curve C, the copolymers represented were prepared from 92.5% vinyl chloride and 7.5% propylene, the polymerization condition being the same as those specified for Curve B. Curve D is representative of a 90% vinyl chloride-10% propylene monomer feed polymerized with 0.2–0.3% t-butyl peroxy pivalate at 3.5 to 1 water to monomer ratio, and 80% fillage of reactor volume. Curve E is representative of an 85% vinyl chloride-15% propylene monomer feed, the polymerization conditions being the same as those specified for Curve D.

It will be seen from FIG. 3 that the molecular weight of the vinyl chloride-propylene copolymers, as measured by intrinsic viscosity, is strongly influenced by the amount of propylene charged to the batch. It has been found that in order to prepare vinyl chloride-propylene copolymers of high intrinsic viscosity, it is necessary to prepare the copolymers at temperatures substantially less than is conventional for equivalent molecular weight vinyl chloride homopolymers.

The reactivity of catalysts varies, as is well known, and to insure reasonable reaction times, the more active catalysts, such as tert-butyl peroxy pivalate, are used at lower temperatures, while the less active catalysts, such as lauroyl peroxide can be used at the higher temperatures.

Furthermore, it has been found that changes in procedure that alter the relative comonomer concentrations from those found in the simple batch copolymerization technique, similarly affect the molecular weight (as measured by intrinsic viscosity) of the resultant copolymer. Delayed feeds of either comonomer, removal of some of either or both comonomers during the reaction cycle, alteration of reactor fillage( modification of water and monomer ratios, etc., all influence the resultant copolymer molecular weight as well as other polymer properties. It has been found, in general, that any process modification which tends to increase the concentration of propylene in the polymerizing liquid monomer phase, tends to decrease the resulting copolymer molecular weight. Conversely, any process modification which tends to decrease the concentration of propylene in the polymerizing liquid monomer phase, tends to increase the copolymer molecular weight.

The most suitable process for preparing the vinyl chloride-propylene copolymers with which this invention is concerned is essentially of the suspension polymerization type and the monomers are copolymerized in an aqueous system, under constant agitation, in the presence of appropriate suspending and surface active agents, with the pH being advantageously maintained at a value of 5 to 8.5. However, other processes known to the art, such as emulsion, solution, and mass polymerization, can be employed to prepare the copolymers used in the resinous compositions of the present invention.

Various suspending agents such as those which have been disclosed for use in the suspension polymerization of vinyl chloride can be employed, and examples of suitable suspending agents include polyvinyl alcohol, methyl cellulose, e.g. the products known commercially as "Methocel," gelatin, magnesium carbonate, guar gum, silica, magnesium lauryl sulfate, and magnesium silicate. We have found, however, that particularly good results are obtained when the suspending agent is polyvinyl alcohol or methyl cellulose. When polyvinyl alcohol is used as the suspending agent, we prefer to use partially-hydrolyzed polyvinyl alcohol, e.g. polyvinyl alcohol having a percent hydrolysis of 80 to 90, rather than fully hydrolyzed polyvinyl alcohol and of the type which forms solutions of medium viscosity, e.g. 30 to 50 centipoises in a 4% aqueous solution at 20° C. Commercial forms of such polyvinyl alcohol are exemplified by the products known as "Elvanol 50–42," "Gelvatol 20–90," and "Vinol 540." Both "Elvanol 50–42" and "Gelvatol 20–90" are medium viscosity polyvinyl alcohols, having viscosities of 35 to 45 centipoises in a 4% aqueous solution at 20° C., and a percentage hydrolysis of 86 to 89%. "Vinol 540" is a polyvinyl alcohol having a viscosity of about 40 centipoises in a 4% aqueous solution at 20° C., and a percentage hydrolysis of about 87 to 89%. It will be understood, however, that other grades of polyvinyl alcohol can be used.

Suitable as catalysts are the oil soluble free-radical catalysts such as the organic peroxides, e.g. lauroyl peroxide, tert-butyl peroxy pivalate, 2,4-dichlorobenzoyl peroxide, and benzoyl peroxide, or the azo-nitrile catalysts, such as disclosed in Hunt U.S. Patent No. 2,471,959, e.g. azo-bis-isobutyronitrile, which is commercially referred to in the art as "AZN." Also particularly suitable is the use of a water-soluble promotor, such as sodium bisulfite, in combination with the oil-soluble free-radical catalyst.

The quantity of suspending agent can vary widely, but most suitably it is present in the amount of 0.01 to 0.5% by weight based upon the total quantity of monomers in the aqueous system, preferably 0.02 to 0.2% by weight. Similarly, the quantity of catalyst can vary, but best results are obtained when the catalyst is present in the amount of 0.01 to 2.0% by weight based upon the monomers, preferably 0.05 to 0.5% by weight.

The aqueous suspension polymerization system also may advantageously include a wetting agent in the amount of 0.001 to 1.0% by weight of the monomers, preferably 0.005 to 0.5% by weight. Any of the many wetting agents used in suspension polymerization systems may be employed, but most preferably the wetting agent is sodium di-octyl sulfosuccinate, e.g. the product sold commercially as "Aerosol-OT."

In order to maintain the pH of the suspension system at the desired value, there is suitably added an alkaline buffering agent of any convenient type. Any alkaline material which is compatible with the suspending agent can be used as the buffer. The amount of buffer is that sufficient to adjust the pH of the suspension within the desired range. Ammonium and sodium bicarbonate are preferred buffers because of their compatibility with the system and their low cost. The amount of buffer is generally about 0.01 to 0.5% by weight, based on the monomers. Other buffers such as disodium phosphate, sodium acetate, and the like, can, however, also be used. When superior electrical properties are desired in the product, a non-metallic buffer, such as ammonium bicarbonate, is preferred.

The amount of water used is that which is sufficient to accommodate the various components of the system and to support the resultant copolymer in suspension in conventional manner. Thus, ordinarily the weight ratio of water to total monomer is from about 1 to 1 up to about 4 to 1.

In carrying out the polymerization operation, a solution of the suspending agent and wetting agent is first prepared. This is effected by dissolving the wetting agent in sufficient water to form a solution, followed by the portionwise addition of the suspending agent, while stirring the solution vigorously. Alternatively, the suspending agent and the wetting agent can be separately dissolved and the resulting solutions combined. Although it is not necessary to do so, the foregoing steps are suitably carried out with the water at a slightly elevated temperature, e.g., 75°–80° C., and after the solution has been formed it is allowed to cool to room temperature. The foregoing solution is then diluted with enough water to form the desired volume to be charged to the polymerization vessel, and the buffering agent is dissolved in the solution.

The solution is then, in the case of batch polymerization, charged to a suitable polymerization vessel, such as an autoclave constructed to withstand pressures up to about 250 pounds per square inch, and the catalyst is added to the solution. The autoclave is sealed and flushed successively with nitrogen and then with vinyl chloride in vapor form. Agitation of the reactor contents is begun, and the vinyl chloride monomer and the propylene monomer are introduced, the vinyl chloride monomer being introduced as a liquid and the propylene monomer being introduced in liquid or in gaseous form. The polymerization system is then brought to reaction temperature, e.g., 50° C. with constant agitation, and reaction is continued until the desired polymerization is achieved. The time of reaction will, of course, vary, depending upon the size of the apparatus and the volumes of the reactants employed, but, ordinarily, reaction times of 8 to 16 hours are generally sufficient.

The vinyl chloride can be added entirely at the beginning of the reaction, but it can also be added stepwise or intermittently during the course of the reaction, the rate of addition of the liquid monomer being controlled so that there is always free vinyl chloride monomer present in the reaction vessel. This can be readily determined by sampling or by other conventional means.

The ratio between the propylene monomer and the vinyl chloride monomer is selected to provide a copolymer having the above specified content of 1 to 10% or more of propylene. In general, in carrying out the polymerization method described, the ratios between the propylene and vinyl chloride charged are such that the propylene is present usually in at least about 100% excess in relation to the ratios of the two monomers in the finished copolymer, polymerization being continued until most of the vinyl chloride charged has reacted, e.g., 85–95%.

While the invention has been described above in its broader terms, it will be more fully understood by reference to the following specific examples of practical application. In the examples, all parts are by weight, unless otherwise indicated.

Physical characteristics of the vinyl chloride-propylene copolymers, or formable rigid resinous compositions embodying them, which may be referred to below, and which are not identified by previously-mentioned testing methods, are determined by conventional standard tests.

All of the vinyl chloride-propylene copolymers produced in the following examples have the characteristics described above for the resins with which the invention is concerned, including Dynamic Processability Indices of more than 300 when tested in the form of the standard test specimen described.

EXAMPLE 1

A jacketed stainless steel autoclave was employed as the reaction vessel. Agitation was provided by a four-bladed axial-flow impeller and combination baffle-thermowell.

Vinyl chloride and propylene monomers, both CP grade, were employed. The vinyl chloride monomer was distilled before use, whereas the propylene, a low oxygen content type, was used without further purification.

The polymerization mixture was composed of the following components in the proportions indicated:

|  | Quantity (parts by weight) | Percent of total of monomers |
|---|---|---|
| Water | 272 | 175 |
| Vinyl chloride | 147.75 | 95 |
| Propylene | 7.78 | 5 |
| t-Butyl peroxy pivalate (Lupersol 11) | 0.4665 | 0.3 |
| Methyl cellulose (Methocel 90 HG 100 cps.) | 0.0694 | 0.04 |
| Sodium di-octylsulfosuccinate (Aerosol-OT-75% aqueous solution) | 0.00866 | 0.0056 |
| Sodium bicarbonate (buffer) | 0.0354 | 0.0228 |

A solution of the suspending agent and wetting agent was prepared as follows: 0.00866 part of Aerosol-OT in 75% solution was stirred into 6.6 parts of deionized water and heated to 80° C. with agitation and 0.0694 part of the suspending agent (Methocel) was added. The resultant mixture was allowed to cool to room temperature with continuous stirring. The sodium bicarbonate was then added, followed by the addition of 1.1 parts of the deionized water as a rinse to assure a complete transfer of the solution from its preparation vessel to the storage vessel.

The reaction vessel was then charged with 261 parts of deionized water, 0.4665 part of catalyst, and the aqueous suspending agent, wetting agent, buffer, and 3.3 parts deionized rinse water. The reactor was filled to about 85% of its volume. The reactor was then sealed and flushed out successively with nitrogen and vinyl chloride vapor. The distilled vinyl chloride was added as a liquid, after which stirring was commenced, followed by the addition of the propylene. The pressure was 60 p.s.i. before heating was begun. Then the reactants were brought to a reaction temperature of about 51.5° C. over a 40 min. period and allowed to react for 10.5 hours at a pressure of 117–150 p.s.i.g. The temperature of the reaction mixture was then lowered to about 25° C., and the excess monomers vented off. The product was centrifuged and dried in a vacuum oven at a jacket temperature of 85° C. (60° C. resin temperature) and 27″ Hg vacuum for approximately 6 hours. The product obtained in approximately 81% conversion (based on total monomers) was a fine, white, free-flowing powder with a moisture content of 0.05%, contained about 3.6% propylene and 96.4% vinyl chloride by weight, and had an intrinsic viscosity of about 0.75 dl./g.

Using corresponding procedures, other vinyl chloride propylene copolymers were prepared by varying the weight percent of propylene, the reaction temperature, or the peroxide catalyst, the quantity of emulsifier or suspending agent, or monomer ratios.

Typical operating data for these experiments are shown in Table 1. In Table 2 are listed typical property data for the resultant vinyl chloride-propylene copolymers.

TABLE 1

| Example No. | 1 | 2 | 3 | 4 | 5 | 6 | 7 | 8 | 9 |
|---|---|---|---|---|---|---|---|---|---|
| Charge: Percent of total monomer: | | | | | | | | | |
| Vinyl chloride | 95 | 97.5 | 97 | 96 | 92.5 | 90 | 90 | 90 | 85 |
| Propylene | 5 | 2.5 | 3 | 4 | 7.5 | 10 | 10 | 10 | 15 |
| Water | 175 | 318 | 350 | 175 | 200 | 301 | 301 | 350 | 350 |
| Catalyst, type [1] | L11 | LP | L11 | L11 | L11 | L11 | L11 | IPP | L11 |
| Catalyst, percent | 0.3 | 0.34 | 0.17 | 0.3 | 0.3 | 0.3 | 0.3 | 0.25 | 0.3 |
| Methocel 90 HG 100 cps | 0.04 | 0.17 | 0.08 | 0.04 | 0.05 | 0.07 | 0.07 | 0.08 | 0.16 |
| Aerosol OT | 0.0056 | 0.04 | 0.01 | 0.0056 | 0.006 | 0.008 | 0.008 | 0.01 | 0.03 |
| Sodium bicarbonate | 0.023 | | 0.023 | 0.023 | 0.023 | 0.023 | 0.023 | 0.0228 | |
| Reactions conditions: | | | | | | | | | |
| Temp., °F | 125 | 131 | 130 | 115 | 125 | 130 | 135 | 104 | 104 |
| Time, hrs | 10.5 | 19.5 | 9.8 | 10.7 | 9.9 | 10.7 | 11.0 | 11.0 | 66.0 |
| Max. press. p.s.i.g | 150 | 160 | 135 | 110 | 159 | 185 | 200 | 110 | 150 |
| Yield, percent total monomer | 81 | 78 | 84 | 69 | 74 | 76 | 81 | 55 | 75 |

[1] LP—Lauroyl peroxide; L11—Lupersol 11 (tert. butyl peroxypivalate); IPP—diisopropyl peroxydicarbonate.

TABLE 2

| Example No. | 1 | 2 | 3 | 4 | 5 | 6 | 7 | 8 | 9 |
|---|---|---|---|---|---|---|---|---|---|
| Wgt. percent propylene | 3.6 | 3.1 | 1.9 | 2.3 | 4.8 | 5.9 | 7.6 | 4.7 | 6.4 |
| Sp. gr. at 25° C | 1.382 | 1.384 | 1.393 | 1.390 | 1.374 | 1.367 | 1.356 | 1.375 | 1.364 |
| Intrinsic visc., dl./g | 0.75 | 0.77 | 0.76 | 0.92 | 0.65 | 0.59 | 0.55 | 0.79 | 0.70 |
| Melt flow rate, dg./min | 3.4 | 3.2 | 0.75 | 0.20 | 20.8 | 107 | 180 | 3.2 | 23.9 |
| $T_f$, °C | 73.2 | 70.5 | 75.3 | 77.1 | 70.0 | 66.7 | 67.8 | 72.4 | 70.8 |
| Tens. yield stress, p.s.i | 8,030 | 8,950 | 8,050 | 7,950 | 7,750 | 7,950 | 7,950 | 7,750 | |
| Ult. tens. str., p.s.i | 5,500 | 6,100 | 5,700 | 6,100 | 5,450 | 4,650 | 4,200 | 4,850 | |
| Ult. elong., percent | 70 | 50 | 60 | 90 | 70 | 30 | 40 | 60 | |
| Tensile product | 3,900 | 3,050 | 3,400 | 5,500 | 3,800 | 1,400 | 1,700 | 2,900 | |

EXAMPLE 10

The following example illustrates the use of an azonitrile catalyst in the polymerization systems generally described above:

A stainless steel, jacketed autoclave with a single-bladed propeller agitator was employed as the reaction vessel.

Vinyl chloride and propylene monomer, both CP grade, were employed. The vinyl chloride monomer was distilled before use, whereas the propylene monomer was used without further purification.

The polymerization mixture was composed of the following components in the proportions indicated below:

| | Quantity (parts by weight) | Percent of total of monomers |
|---|---|---|
| Water | 2,000 | 232 |
| Vinyl chloride | 765 | 89 |
| Propylene | 96 | 11 |
| AZN | 4.0 | 0.465 |
| Methyl cellulose (Methocel 90 HG 100 cps.) | 0.75 | 0.087 |
| Sodium di-octylsulfosuccinate (Aerosol-OT-0.75% aqueous solution) | 0.06 | 0.007 |
| Sodium bicarbonate (buffer) | 0.1 | 0.012 |

A solution of the suspending agent, wetting agent and buffer was prepared as described in Example 1, the quantities above indicated being used.

The reaction vessel was then charged with the aqueous solution containing suspending agent, wetting agent and buffer. The catalyst (AZN) was added immediately before sealing. The reactor was then sealed and flushed out with nitrogen. Stirring was commenced and distilled vinyl chloride monomer added as a liquid, followed by the addition of gaseous propylene. The reactor was about 50% full when completely charged. The reactants were brought to a reaction temperature of 50° C. over a 30 min. period and allowed to react for 20 hours at a pressure of 135 to 140 pounds per square inch. The reaction temperature was then lowered to approximately 30° C., and the excess monomers vented off. The product was separated on a Büchner funnel, air dried for 24 hours and then dried in a vacuum oven at 50° C. for approximately 12 hours. The product obtained in 52% conversion (based on total monomers) was a fine, white, free-flowing powder with a moisture content of less than 0.3%, contained about 5.3% propylene and 94.7% vinyl chloride by weight, and had an intrinsic viscosity of about 0.70.

In the standard rigid composition containing 3% T-360 stabilizer, the following properties were obtained:

Melt flow rate, dg./min. _____ 15
$T_f$, °C. _____ 71

EXAMPLE 11

Using the general procedure described in Example 11 but using a 91/9 vinyl chloride to propylene ratio and using polyvinyl alcohol as the suspending agent, there was prepared a vinyl chloride propylene copolymer in 46% yield. The product contained 4.4% propylene and 95.6% vinyl chloride by weight, and had an intrinsic viscosity of 0.73 dl./g.

EXAMPLE 12

The following example illustrates the use of Redox catalysts in producing vinyl chloride-propylene copolymers.

A stainless steel, jacketed autoclave with a single bladed propeller agitator was employed as the reaction vessel.

Vinyl chloride and propylene monomers, both CP grade, were employed. The vinyl chloride monomer was distilled before use, whereas the propylene monomer was used without further purification.

The polymerization mixture was composed of the following components in the proportions indicated below:

| | Quantity (parts by weight) | Percent of total of monomers |
|---|---|---|
| Water | 450 | 205 |
| Vinyl chloride | 190 | 86.4 |
| Propylene | 30 | 13.6 |
| $K_2S_2O_8$ | 1.2 | 0.55 |
| $NaHSO_3$ | 1.0 | 0.45 |
| $MgCO_3$ | 0.3 | 0.14 |
| Sodium di-octylsulfosuccinate (Aerosol-OT) | 0.025 | 0.011 |
| NaOH | 0.24 | 0.11 |

A slurry of the suspending agent and wetting agent was prepared as follows: the Aerosol-OT was dissolved in 450 parts of distilled water (at approximately 25° C.) with agitation, followed by the portionwise addition of the $MgCO_3$ to the rapidly stirred solution. This was followed by the addition of the NaOH to the slurry.

The reaction vessel was then charged with the aqueous slurry containing suspending agent, wetting agent and caustic soda. The redox catalyst components ($K_2S_2O_8$ and NaHSO₃) were added immediately before sealing. The reactor was then sealed and flushed out with nitrogen. Distilled vinyl chloride monomer (190 parts) was added as a liquid, followed ½-hour later by the addition of gaseous propylene to a pressure of 140 p.s.i.g. (30 parts) at 28° C. Stirring was commenced following the propylene charge. The reactor was about 74% full when completely charged. The reactants were brought to a reaction temperature of 30° C. over a period of a few minutes. The polymerization was allowed to proceed for 12 hours at a propylene pressure of 85 to 90 pounds p.s.i. The excess monomers were vented off. The product was separated on a Büchner funnel, air dried and then dried in a vacuum oven at 50° C. for approximately 26 hours. The product obtained in approximately 56% conversion (based on total monomers) was a fine, white, free-flowing powder with a moisture content of less than 0.1%, contained 6.7% propylene and 93.3% vinyl chloride by volume, and had an intrinsic viscosity of about 0.81 dl./g.

In the standard rigid composition containing 3% T–360 stabilizer, the following properties were obtained:

Melt flow rate, dg./min. _____ 6.9
$T_f$, ° C. _____ 69.6
Heat stability, min. to black at 400° F. _____ >50

Particularly good results have also been obtained with a modified Redox catalyst system comprising a peroxy catalyst and a reducing agent. The following example is illustrative of this process of producing vinyl chloride propylene copolymers having the desirable combination of properties discussed above.

EXAMPLE 13

A stainless steel, jacketed 50-gallon autoclave with an axial flow turbine agitator was employed as the reaction vessel.

Vinyl chloride and propylene monomers, both CP grade, were employed. The vinyl chloride monomer was distilled before use, whereas the propylene monomer was used without further purification.

The polymerization mixture was composed of the following components in the proportions indicated below:

| | Quantity (parts by weight) | Percent of total of monomers |
|---|---|---|
| Water | 291 | 300 |
| Vinyl chloride | 90.0 | 91.7 |
| Propylene | 8.1 | 8.3 |
| t-Butyl peroxy pivalate (Lupersol 11) | 0.372 | 0.38 |
| NaHSO₃ | 0.1216 | 0.124 |
| Methyl cellulose (Methocel 90 HG 100 cps.) | 0.1298 | 0.1322 |
| Sodium di-octylsulfosuccinate (Aerosol-OT-75% aqueous solution) | 0.0162 | 0.0166 |
| Magnesium carbonate | 0.0486 | 0.0496 |

A solution of the suspending agent and wetting agent was prepared as follows: 0.0162 part of an Aerosol-OT in 75% solution was stirred into 6.6 parts of deionized water and heated to 80° C. with agitation. To the resultant solution was added 0.1298 part of Methocel and the mixture was allowed to cool to room temperature with continuous stirring. The magnesium carbonate was then added, followed by the addition of 1.1 parts of the deionized water as a rinse to assure a complete transfer of the solution from its preparation vessel to the storage vessel.

The reaction vessel was then charged with 280 parts of deionized water, 0.372 part of Lupersol 11, and 0.1216 part of NaHSO₃, and the aqueous suspending agent, wetting agent, buffer and 3.3 parts deionized rinse water. The reactor was filled to about 81% of its jacketed working volume. The reactor was then sealed and flushed out successively with nitrogen and vinyl chloride vapor. The distilled vinyl chloride was added as a liquid, after which stirring was commenced, followed by the addition of the propylene. The pressure was 70 p.s.i. before heating was begun. Then the reactants were brought to a reaction temperature of about 46° C. over a 30 min. period and allowed to react for 10.8 hours at a pressure of 130–192 p.s.i.g. The temperature of the reaction mixture was then lowered to about 25° C., and the excess monomers vented off. The product was centrifuged and dried in a vacuum oven at a jacket temperature of 85° C. (60° C. resin temperature) and 27″ Hg vacuum for approximately 6 hours. The product obtained in approximately 65% conversion (based on total monomers) was a fine, white, free-flowing powder with a moisture content of 0.03%, contained about 4.2% propylene and 95.8% vinyl chloride by weight, and had an intrinsic viscosity of about 0.78 dl./g.

Following the general procedure described in the Examples 12 and 13, other vinyl chloride-propylene copolymers were produced with Redox catalyst systems by varying the pressure, the temperature, the propylene feed, etc. The operating data for these experiments, as well as those of Examples 12 and 13, are set forth in Table 3 and the properties of the resultant copolymers are tabulated in Table 4, along with those of the copolymers produced in Examples 12 and 13.

TABLE 3

| Example No. | 12 | 13 | 14 | 15 |
|---|---|---|---|---|
| Charge: percent of total monomers | | | | |
| Vinyl chloride | 86.4 | 91.7 | 91.6 | 88.2 |
| Propylene | 13.6 | 8.3 | 8.4 | 11.8 |
| Water | 204 | 300 | 183 | 176 |
| K₂S₂O₈ | 0.546 | | | |
| Lupersol 11 | | 0.38 | 0.366 | 0.31 |
| NaHSO₃ | 0.455 | 0.124 | 0.115 | 0.31 |
| Methocel 90 HG 100 | | 0.132 | 0.092 | 0.098 |
| Elvanol 50–42 | | | | |
| Aerosol OT | 0.011 | 0.0166 | 0.015 | 0.0098 |
| Magnesium carbonate | 0.136 | 0.0496 | | |
| Magnesium stearate | | | | |
| NaHCO₃ | | | 0.038 | |
| NaOH | 0.11 | | | |
| MgCl₂·6H₂O | | | 0.0076 | |
| Reaction conditions: | | | | |
| Temp., °F | 86 | 115 | 113 | 104 |
| Time, hrs | 12.0 | 10.8 | 12.0 | 12.0 |
| Max. p.s.i.g | 90 | 130 | 200 | 130 |
| Yield, percent total monomers | 56 | 65 | 75 | 27 |

TABLE 4

| Example No. | 12 | 13 | 14 | 15 |
|---|---|---|---|---|
| Wgt. percent propylene | 6.7 | 4.2 | 2.5 | 5.3 |
| Sp. Gr. at 25° C | 1.365 | 1.378 | 1.389 | 1.371 |
| Intrinsic vis., dl./g | 0.81 | 0.78 | 1.08 | 1.00 |
| Melt flow rate, dg./min | 6.9 | 4.4 | 0.11 | 0.69 |
| $T_f$, ° C | 69.6 | 73.7 | 77.5 | 74.0 |

It will thus be seen that vinyl chloride-propylene copolymers, having the combination of characteristics discussed above and graphically shown in FIG. 1, can be prepared by several methods, and appropriate variations in these methods, to bring about the desired variations in the resin characteristics, within the framework of the specific combination of relationships specified, will be readily apparent to those skilled in the art.

As previously indicated, we have made the discovery that vinyl chloride-propylene copolymers of the character indicated can be formed into formable compositions for molding, extrusion and like operations, which have unique dynamic processability which makes them suitable for uses heretofore foreclosed to polyvinyl chloride homopolymers, yet having desirable product characteristics. These compositions open an entirely new field of vinyl chloride polymer applications.

Optimum dynamic processability is a combination of high melt flow and high thermal stability, resulting in extremely low melt viscosities at the maximum temperatures permitted by the inherent stability of the resin under high shear conditions. Resinous compositions having high melt flow with poor thermal stability or resinous compositions having low melt flow with high thermal stability do not have good dynamic processability. The former must be handled at relatively low temperatures to avoid decomposition and, therefore, melt viscosity will increase considerably, whereas the latter never attains a low melt viscosity even at higher processing temperatures.

Example 16 illustrates a commercial injection molding machine operation in which three vinyl chloride-propylene copolymers having the characteristic combination of properties discussed above were compared with a commercial PVC homopolymer in identical formulations, and with a commercial vinyl chloride-vinyl acetate copolymer composition recommended commercially for this application.

EXAMPLE 16
[Ankerwerke screw-injection molding machine (30 oz. capacity)]

| Resin properties | Molding compositions | | | |
|---|---|---|---|---|
| | Commercial PVC homopolymer (Bakelite QYSA) | Vinyl chloride-propylene copolymers | | |
| | | a | b | c |
| Resin intrinsic viscosity, dl./g | 0.63 | 0.77 | 0.67 | 0.55 |
| Wgt. percent propylene | 0 | 3.0 | 5.9 | 5.9 |
| Compound properties,[1] melt flow rate, dg./min | 9.9 | 4.7 | 29.8 | 162 |

[1] Contains 3 phr. liquid organic tin stabilizer (Thermolite 31) and 0.5 phr. mineral oil lubricant.

All three vinyl chloride-propylene copolymers molded successfully without degradation. Compound a was run at center and front cylinder zone temperatures of 390 and 410° F. with excellent quality, color, clarity and gloss.

Compound b, running at 380° and 400° F. cylinder temperatures, remained stagnant in the cylinder for about 20 minutes because of equipment problems. Nevertheless, moldings without signs of degradation were obtained when operation was resumed.

The QYSA formulation filled the mold at 340° and 340° F. cylinder zone temperatures but began to decompose after a few moldings and had to be shut down.

A commercial compound based on a low molecular weight (0.52 dl./g. intrinsic viscosity) vinyl chloride-vinyl acetate (87/13) copolymer had a melt flow rate of 440 dg./min. but an oven heat stability of less than 15 minutes. Even at low processing temperatures (300° and 340° F. cylinder zones) decomposition was evident by carbon formation. Molding quality was poor as determined by the acetone immersion test. Heat distortion temperature was only 130° F., and Izod impact strength was only 0.2 ft. lb./inch notch. The three vinyl chloride-propylene copolymers were markedly superior in all end-properties.

EXAMPLE 17

This example illustrates the use of an alkyl acrylate-methacrylate resin, such as the product sold under the name Acryloid KM-228, as a modifying resin. A vinyl chloride-propylene copolymer resin, intrinsic viscosity= 0.74 dl./g. and containing 3.9 weight percent propylene, was compounded with 2 phr. (parts per 100 parts resin) solid organic tin stabilizer (an equal mixture of Advance T-360 and T-270) in two formulations, with and without 30 phr. Acryloid KM-228. Notched Izod impact resistance values were 14.3 and 0.9 f.p.i. respectively.

A similar composition based on QYSA, a commercial PVC homopolymer resin (0.63 dl./g. intrinsic viscosity) with equivalent melt flow and containing 27 phr. Acryloid KM-228, showed an Izod value of only 6.4 f.p.i.

The Acryloid modified copolymer was extruded at 355° F. and blow molded into 1 quart Boston round bottles. When filled with 2 lbs. of water, these bottles showed outstanding break resistance on a 9-foot drop.

EXAMPLE 18

This example illustrates the use of an acrylonitrile-butadiene-styrene resin, such as the product sold under the name Blendex 301, as a modifying resin in two vinyl chloride-propylene compositions:

| | Intrinsic viscosity (dl./g.) | Wgt. percent propylene | Melt flow (dg./min.) |
|---|---|---|---|
| (a) | 0.65 | 5.2 | 20.8 |
| (b) | 0.74 | 4.0 | 4.9 |

Each formulation was compounded with 4.0 phr. calcium-zinc organic stabilizers and 30 and 20 phr. Blendex in (a) and (b) respectively. Corresponding notched Izod impact resistance values were 12.8 and 20.1 f.p.i. One quart oil can containers were satisfactorily blow molded from each formulation at extruder temperatures of about 330° and 360° F., respectively.

EXAMPLE 19

This example illustrates the processability advantages of vinyl chloride-propylene copolymer resins in formulations designed for food packaging applications. Such formulations require the use of non-toxic calcium and zinc organic stabilizers, which are much less effective than stabilizers such as tin, lead, cadmium and barium organic compounds which are unacceptable in connection with food.

Four copolymers were compared with a QYSA commercial homopolymer. Resin properties were as follows:

| | QYSA | Copolymers | | | |
|---|---|---|---|---|---|
| | | A | B | C | D |
| Intrinsic viscosity, dl./g | 0.63 | 0.90 | 0.68 | 0.58 | 0.57 |
| Wgt. percent propylene | | 2.8 | 5.0 | 5.9 | 6.7 |
| Melt flow rate, dg./min | 4.3 | 0.46 | 18.0 | 75 | 128 |

These resins were compounded as follows, each additive being expressed in parts by weight per 100 parts of resin.

| | QYSA | QYSA | A | B | C | D |
|---|---|---|---|---|---|---|
| Mark QED | 1 | 1 | 1 | 1.5 | 1 | 1 |
| Mark 35 | 1 | 1 | 1 | | | 1 |
| Calcium stearate | | | 2 | 2 | | 4 |
| Mineral oil | | | | | 0.75 | 0.75 |

One quart containers were extrusion-blow molded from the resultant compounds. All four copolymer compounds processed without degradation whereas the QYSA compounds showed immediate and serious discoloration.

EXAMPLE 20

The vinyl chloride-propylene copolymer compositions of this invention are also effective for extrusion operations such as the extrusion of a film. A composition consisting of 2 parts by weight of a solid organic tin stabilizer and 100 parts by weight of vinyl chloride-propylene copolymer containing 8.0 weight percent propylene, an intrinsic viscosity of 0.57 dl./g. and a melt flow rate of 150 dg./min., was formed into a film by extrusion casting onto a polished roll, at gauges down to about 2 mils. Extruder zone temperatures were set at 220°, 335°, 360° and 325° F. with a die head temperature of 382° F. No degradation occurred during a one hour run.

The resulting film had a moisture vapor transmission rate of 0.35 grams/100 sq. in./day and an oxygen permeability of about 6 cc./100 sq. in./day.

EXAMPLE 21

The following Tables 5 and 6 show compositions according to the invention comprising various stabilizers and lubricants in combination with four typical vinyl chloride-propylene copolymers, with and without fillers and polymeric modifiers; viz:

| | VC-P copolymer resins | | | |
|---|---|---|---|---|
| | A | B | C | D |
| Intrinsic viscosity, dl./g | 0.90 | 0.74 | 0.68 | 0.60 |
| Wt. percent propylene | 2.8 | 3.5 | 5.2 | 6.3 |
| Melt flow rate, dg./min | 0.46 | 5.5 | 21.9 | 91.9 |

TABLE 5

| | 100 parts copolymer A in rigid formulations | | | | | | |
|---|---|---|---|---|---|---|---|
| | a | b | c | d | e | f | g |
| Advastab T-360 | 3.0 | 3.0 | 3.0 | | | | |
| Argus QED | | | | 1.0 | 1.5 | | |
| Argus Mark 35 | | | | 1.0 | 1.5 | | |
| Federal 201 | | | | | | 3 | 3 |
| Federal 101 | | | | | | | 1.5 |
| Federal 401 | | | | | | | 0.5 |
| Advawax 140 | | 1.0 | 1.5 | | | | |
| Advawax 280 | | 1.0 | 1.5 | | | | |
| Calcium stearate | | | | 2.0 | 2.0 | | |
| Melt flow rate, dg./min | 0.46 | 0.67 | 1.4 | 0.93 | 1.7 | 2.0 | 1.6 |
| $T_f$, °C | 75.5 | 72.8 | | 77.1 | 76.8 | 77.1 | 74.1 |

TABLE 6

| | 100 parts copolymers in rigid formulations | | | | | | |
|---|---|---|---|---|---|---|---|
| | a | b | c | d | e | f | g |
| Copolymer type | B | B | B | C | C | C | D |
| Thermolite 31 | 3.0 | | | 3.0 | | | |
| Advastab T-360 | | 1.5 | 1.5 | | | | |
| Advastab T-270 | | 1.5 | 1.5 | | | | |
| Mark QED | | | | | | 2.0 | 2.0 |
| Mark 35 | | | | | | 2.0 | |
| Basic lead carbonate | | | | 5.0 | | | |
| Calcium stearate | | | | 2.0 | | | |
| Mineral oil | 0.8 | | | 0.8 | | | 0.8 |
| Acryloid KM228 | | | 30.0 | | | | |
| Clay No. 33 | | | | | 8.0 | | |
| Cadmium carbonate | | | | | | 20.0 | |
| Titanium dioxide | | | | | | 2.0 | |
| Melt flow rate, dg./min | 15.0 | 8.3 | 4.1 | 45.3 | 26.4 | 66.8 | 129 |
| $T_f$, °C | 63 | 73 | 72 | 62 | 73 | 72 | 64 |

The stabilizers used in the compositions set forth in the foregoing tables and in the preceding portions of this specification are standard commercial compounds well known to the vinyl polymer art. The chemical nature of Mark 292 and Thermolite 31 has been previously indicated. Advastab T-270 and Advastab T-360 are solid organic tin mercaptides of the type disclosed in U.S. Patent No. 3,027,350, the former being an octyl compound. Mark QED is composed of calcium, magnesium, and zinc fatty acid soaps and Mark 35 is a zinc fatty acid soap. Advawax 140 is a solid fatty ester wax and Advawax 280 is N,N'-ethylene bis-stearamide wax. Federal 101 is triphenyl phosphite, Federal 201 is composed of mixed barium and cadmium stearates and Federal 401 is zinc stearate.

As previously indicated, the particular advantage of the compositions of this invention is that they can be used in conventional molding, extrusion, or other hot shaping apparatus, under the conditions at which such apparatus is built to operate, to produce quality rigid products efficiently and effectively. For example, blow molding, or other pressure-differential molding operations, such as thermoforming, for which the rigid resinous compositions of the invention are particularly suited, can be carried out in known equipment, using known techniques. A typical blow-molding system is described, for example in Gasmire U.S. Patent No. 3,065,501. In like manner injection molding, and other plastic shaping operations can be carried out in standard equipment and by standard processes. A description of various types of apparatus for the hot shaping of fluxed resinous compositions, which can be termed "thermo-molding," and with which the compositions of this invention can be used, is conveniently found in "The Encyclopedia of Plastics Equipment," edited by Herbert R. Simonds and published by Reinhold Publishing Corp., New York (1964). In other words, the compositions of this invention can easily be processed effectively at temperatures of 250 to 450° F. Yet, they will produce rigid shaped products which are not marred by discoloration due to degradation of the polymer and have desirably elevated heat distortion characteristics.

It will be apparent to those skilled in the art that various changes and modifications may be made in the embodiments described above without departing from the invention, as defined in the appended claims. It is intended, therefore, that all matter contained in the foregoing description and in the drawings shall be interpreted as illustrative only and not as limitative of the invention.

We claim:

1. A vinyl chloride-propylene copolymer having a propylene content of 2% to 10% by weight, an average molecular weight, expressed in terms of intrinsic viscosity, of 0.5 to 1.5 dl./g., a melt flow rate of at least 0.1 dg./min., an optical density below 0.5 in cyclohexanone, and characterized by a dynamic processability index of at least 300.

2. A vinyl chloride-propylene copolymer as defined in claim 1, having a propylene content of about 3% to about 7% by weight.

3. A vinyl chloride-propylene copolymer as defined in claim 1, having an intrinsic viscosity of about 0.55 to about 0.95 dl./g.

4. A vinyl chloride-propylene copolymer as defined in claim 1, characterized by a dynamic processability index of at least 400.

5. A vinyl chloride-propylene copolymer as defined in claim 1, having a composition-melt flow relationship substantially within the area delineated by the points A, B, C and D of FIG. 1 of the attached drawings.

6. A rigid resinous composition adapted to be thermomolded to provide a shaped article which comprises a vinyl chloride-propylene copolymer as defined in claim 1 and a stabilizer.

7. A rigid resinous composition as defined in claim 6, wherein the vinyl chloride-propylene copolymer is characterized by a dynamic processability index of at least 400.

8. A rigid resinous composition as defined in claim 6, wherein said stabilizer is a non-toxic stabilizer.

9. A shaped article formed from a rigid resinous composition as defined in claim 6.

10. A molding composition for the manufacture of rigid polyvinyl chloride resin shaped articles for the packaging of foods comprising, a vinyl chloride-propylene copolymer resin having a propylene content of 2% to 10% by weight, an average molecular weight, expressed in terms of intrinsic viscosity of 0.5 to 1.1 dl./g., a melt flow rate of at least 0.1 dg./min., an optical density below 0.5 in cyclohexanone, and characterized by a dynamic processability index of at least 300, a non-toxic stabilizer in an amount of from about 0.5 to 5% by weight of the resin, and an effective amount of molding lubricant, said molding composition being characterized by the fact that it can be thermo-molded at a temperature within the range of about 250° F. to about 450° F. to form a shaped article which has a heat distortion temperature in excess of 150° F. without adverse formation of decomposition products resulting from the decomposition of said resin during the molding operation.

11. A resinous composition comprising a vinyl chloride-propylene copolymer as defined in claim 1 and a filler.

12. A resinous composition comprising a vinyl chloride-propylene copolymer as defined in claim 1 and a polymeric modifier.

13. A resinous composition as defined in claim 12, wherein said polymeric modifier imparts improved impact characteristics to said composition.

References Cited

UNITED STATES PATENTS

| | | | |
|---|---|---|---|
| 2,422,392 | 6/1947 | Brubaker et al. | 260—87.5 |
| 2,875,187 | 2/1959 | Gerhard. | |
| 3,145,194 | 8/1964 | Heckmaier et al. | 260—79.3 |

FOREIGN PATENTS

| | | |
|---|---|---|
| 961,254 | 6/1964 | Great Britain. |
| 578,584 | 8/1946 | Great Britain. |
| 767,417 | 2/1957 | Great Britain. |
| 578,992 | 6/1946 | Great Britain. |

OTHER REFERENCES

PVC Technology, by Penn, W. S. Maclaren & Sons, Ltd., 1962, pp. 45, 170–171 and 137–138.

JOSEPH L. SCHOFER, Primary Examiner

JOHN A. DONAHUE, Jr., Assistant Examiner

PO-1050
(5/69)

UNITED STATES PATENT OFFICE
CERTIFICATE OF CORRECTION

Patent No. 3,468,858                      Dated September 23, 1969

Inventor(s) Charles A. Heiberger and Leon Fishbein

It is certified that error appears in the above-identified patent and that said Letters Patent are hereby corrected as shown below:

1. Col. 1, line 55, "material" should read -- materials --.
2. Col. 4, line 16, "millicrons" should read -- millimicrons --.
3. line 41, "copolymer" should read -- copolymers --;
4. line 52, "copolymer" should read -- copolymers --.
5. Col. 13, line 36, "monomer" should read -- monomers --.
6. Col. 14, line 35, "11" should read -- 10 --.

SIGNED AND
SEALED

JUN 2 1970

(SEAL)
Attest:

Edward M. Fletcher, Jr.
Attesting Officer

WILLIAM E. SCHUYLER, JR.
Commissioner of Patents